US011111558B2

(12) United States Patent
Takashima et al.

(10) Patent No.: US 11,111,558 B2
(45) Date of Patent: Sep. 7, 2021

(54) HOT-PRESSED MEMBER AND METHOD FOR MANUFACTURING SAME, AND COLD-ROLLED STEEL SHEET FOR HOT PRESSING AND METHOD FOR MANUFACTURING SAME

(71) Applicant: JFE STEEL CORPORATION, Chiyoda-ku Tokyo (JP)

(72) Inventors: Katsutoshi Takashima, Tokyo (JP); Takashi Kobayashi, Tokyo (JP); Yoshimasa Funakawa, Tokyo (JP); Seiji Nakajima, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 56 days.

(21) Appl. No.: 16/619,814

(22) PCT Filed: Mar. 30, 2018

(86) PCT No.: PCT/JP2018/013720
§ 371 (c)(1),
(2) Date: Dec. 5, 2019

(87) PCT Pub. No.: WO2019/003541
PCT Pub. Date: Jan. 3, 2019

(65) Prior Publication Data
US 2020/0131597 A1   Apr. 30, 2020

(30) Foreign Application Priority Data
Jun. 30, 2017   (WO) ................. PCT/JP2017/024259

(51) Int. Cl.
*B32B 15/01* (2006.01)
*C21D 9/48* (2006.01)
*C21D 6/00* (2006.01)
*C21D 8/04* (2006.01)
*C22C 38/00* (2006.01)
*C22C 38/02* (2006.01)
*C22C 38/06* (2006.01)
*C22C 38/08* (2006.01)
*C22C 38/22* (2006.01)
*C22C 38/24* (2006.01)
*C22C 38/26* (2006.01)
*C22C 38/28* (2006.01)
*C22C 38/32* (2006.01)
*C22C 38/38* (2006.01)
*C22C 38/60* (2006.01)
*C23C 2/06* (2006.01)
(Continued)

(52) U.S. Cl.
CPC .............. *C21D 9/48* (2013.01); *B32B 15/012* (2013.01); *B32B 15/013* (2013.01); *C21D 6/002* (2013.01); *C21D 6/005* (2013.01); *C21D 6/007* (2013.01); *C21D 6/008* (2013.01); *C21D 8/0405* (2013.01); *C21D 8/0426* (2013.01); *C21D 8/0436* (2013.01); *C21D 8/0463* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/60* (2013.01); *C23C 2/06* (2013.01); *C23C 2/12* (2013.01); *C23C 2/40* (2013.01); *C21D 2211/001* (2013.01); *C21D 2211/008* (2013.01)

(58) Field of Classification Search
None
See application file for complete search history.

(56) References Cited

U.S. PATENT DOCUMENTS 7,682,559 B2    3/2010   Hamada et al.
9,938,597 B2    4/2018   Murakami et al.
(Continued)

FOREIGN PATENT DOCUMENTS

CN    1692167 A    11/2005
CN    101736193 A    6/2010
(Continued)

OTHER PUBLICATIONS

Feb. 1, 2021, Office Action issued by the China National Intellectual Property Administration in the corresponding Chinese Patent Application No. 201880042606.8 with English language search report.
(Continued)

*Primary Examiner* — Daniel J. Schleis
(74) *Attorney, Agent, or Firm* — Kenja IP Law PC

(57) ABSTRACT

Disclosed is a hot-pressed member that can exhibit very high tensile strength after hot pressing as high as TS: 1780 MPa or more, and excellent resistance to resistance welding cracking by properly adjusting its chemical composition and its microstructure such that a prior austenite average grain size is 7.5 μm or less, a volume fraction of martensite is 95% or more, and at least 10 Nb-based and Ti-based precipitates having a grain size of less than 0.10 μm are present on average per 100 μm² of a cross section parallel to a thickness direction of the member within a range of 100 μm or less in the thickness direction from the surface of the member, and such that a B concentration in prior austenite grain boundaries is at least 3.0 times a B concentration at a position 5 nm away from the grain boundaries.

16 Claims, No Drawings

(51) Int. Cl.
    *C23C 2/12*    (2006.01)
    *C23C 2/40*    (2006.01)

(56)            References Cited

U.S. PATENT DOCUMENTS 10,029,294 B2    7/2018   Yamano et al.
    10,060,005 B2    8/2018   Hikida et al.
    2004/0146736 A1  7/2004   Ivanov et al.
    2017/0029913 A1  2/2017   Bae et al.
    2017/0096724 A1* 4/2017   Hikida .................. C21D 1/673

FOREIGN PATENT DOCUMENTS

CN      102712977 A     10/2012
    CN      106103782 A     11/2016
    JP      2008169452 A     7/2008
    JP      2011173135 A     9/2011
    JP      2013185245 A     9/2013
    JP      2013226599 A    11/2013
    WO      2007129676 A1   11/2007
    WO      2015147216 A1   10/2015

OTHER PUBLICATIONS

Jun. 26, 2018, International Search Report issued in the International Patent Application No. PCT/JP2018/013720.

* cited by examiner

HOT-PRESSED MEMBER AND METHOD FOR MANUFACTURING SAME, AND COLD-ROLLED STEEL SHEET FOR HOT PRESSING AND METHOD FOR MANUFACTURING SAME

BACKGROUND

The present disclosure relates to a hot-pressed member and a method for manufacturing the same, and a cold-rolled steel sheet for hot pressing and a method for manufacturing the same, and particularly to the improvement of resistance to resistance welding cracking of a hot-pressed member.

As used herein, the term "hot-pressed member" refers to a member obtained by hot press forming a cold-rolled steel sheet having quench hardenability to increase its strength.

In addition, examples of the cold-rolled steel sheet disclosed herein include not only general cold-rolled steel sheets, but also hot-dip galvanized cold-rolled steel sheets (including galvannealed cold-rolled steel sheets), electrogalvanized cold-rolled steel sheets (including zinc-nickel alloy-electroplated cold-rolled steel sheets), and aluminum-coated or aluminum-plated cold-rolled steel sheets.

BACKGROUND

In recent years, $CO_2$ emission regulations have become more stringent due to rising environmental problems, and in the automobile field, weight reduction of vehicle bodies has become an issue for reduced fuel consumption. To this end, sheet metal thinning by application of high-strength steel sheets to automobile parts is advanced, and application of steel sheets with tensile strength (TS) of 1780 MPa or more is considered.

High-strength steel sheets used for structural members and reinforcing members of automobiles are required to have excellent formability. However, in a steel sheet with TS of 1780 MPa or more, cracking would occur during cold press forming due to low ductility and large spring back would occur due to high yield strength. Therefore, after cold press forming, high dimension accuracy can not be obtained.

Under such circumstances, as a method for obtaining high strength, recently, press forming by hot pressing (also referred to as hot stamping, die quenching, press quenching, and so on) has been focused. Hot pressing is a forming method that enables forming with high dimensional accuracy by heating a steel sheet to the temperature range of austenite single phase and then forming (processing) the steel sheet at the high temperature, and that enables increase of the strength through quenching by cooling the steel sheet after the forming.

However, although many automobile assembly processes are accomplished by resistance spot welding, and when there is a coating or plating containing Zn on the surface of a cold rolled steel sheet for hot pressing, or when a cold rolled steel sheet for hot pressing is assembled by resistance spot welding with a coated or plated steel sheet containing Zn even if not coated or plated (without being subjected to coating or plating treatment), there is a concern about resistance welding cracking in which the zinc on the surface of the steel sheet melts during welding, and residual stress is generated in the vicinity of the weld, causing liquid metal embrittlement and cracks in the steel sheet.

Conventionally, as a method of suppressing liquid metal embrittlement at the time of hot pressing, JP2013-226599A (PTL1) describes a method of controlling the radius of curvature of the shoulder of the mold at the time of pressing, the thickness of the steel sheet, and the forming start temperature.

CITATION LIST

Patent Literature

PTL 1: JP2013-226599A

SUMMARY

Technical Problem

However, liquid metal embrittlement occurring at the time of resistance spot welding is such embrittlement that occurs in a short time and in a high temperature range compared to liquid metal embrittlement that occurs at the time of hot pressing, and the mechanism of generation of liquid metal embrittlement is completely different between the two.

In addition, it is conceivable to suppress the occurrence of liquid metal embrittlement by changing the welding conditions, yet in that case it is necessary to replace the welding machine and the cost increases accordingly. Therefore, it has been desired that the steel sheet itself is resistant to liquid metal embrittlement and is excellent in resistance to resistance welding cracking.

Solution to Problem

Therefore, as a result of intensive investigations in view of the above circumstances, the present inventors discovered that in order to suppress resistance welding cracking of a hot-pressed member, it is effective to, as the microstructure of the member, cause fine Nb-based and Ti-based precipitates to disperse on the surface layer of the member, and to strengthen the prior austenite grain boundaries with B, making it possible to suppress the resistance welding cracking in the hot-pressed member while having high tensile strength.

Liquid metal embrittlement at the time of resistance spot welding of a hot-pressed member is caused by a tensile stress due to solidification shrinkage upon entry of Zn into former austenite grain boundaries at a welding heat affected zone (HAZ) in the vicinity of a nugget during resistance spot welding, or by a tensile stress at the time of opening the electrode due to a bending moment upon generation of a strike angle, and so on.

As a countermeasure for this problem, the inventors discovered that by dispersing fine Ti-based and Nb-based precipitates within a range of 100 μm in the thickness direction from the surface of the member to refine the prior austenite average grain size, and by maintaining this refinement even during resistance spot welding to improve the toughness at high temperature, the resistance to resistance welding cracking of the hot-pressed member is improved.

The inventors also discovered that if B is segregated at prior austenite grain boundaries to strengthen the grain boundaries, the embrittlement is suppressed by the grain boundary strengthening with B even if Zn enters into the grain boundaries, and thus the resistance to resistance welding cracking is improved.

The present disclosure was completed based on the above discoveries.

Specifically, primary features of the present disclosure are as follows.

1. A hot-pressed member comprising: a steel chemical composition containing (consisting of), by mass %, C: 0.28% or more and less than 0.42%, Si: 1.5% or less, Mn: 1.0% or more and 2.4% or less, P: 0.05% or less, S: 0.005% or less, Al: 0.01% or more and 0.50% or less, N: 0.005% or less, Nb: 0.005% or more and 0.15% or less, Ti: 0.005% or more and 0.15% or less, and B: 0.0005% or more and 0.0050% or less, where among the components of the member, C, Si, Nb, Ti, N, and B satisfy the following Expression (1), $$(Nb+(Ti-3.4N)+100B)/((C/8)+Si) \geq 0.25 \quad (1)$$

where each element symbol represents the content by mass % of the corresponding element, with the balance being Fe and inevitable impurities; a microstructure in which a prior austenite average grain size is 7.5 µm or less, a volume fraction of martensite is 95% or more, and at least 10 Nb-based and Ti-based precipitates having a grain size of less than 0.10 µm are present on average per 100 µm² of a cross section parallel to a thickness direction of the member within a range of 100 µm in the thickness direction from a surface of the member; a B concentration in prior austenite grain boundaries being at least 3.0 times a B concentration at a position 5 nm away from the grain boundaries; and a tensile strength of 1780 MPa or more.

2. The hot-pressed member according to 1., wherein the steel chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to 1. or 2., comprising, on a surface layer thereof, an Al or Al alloy coating or plating layer or a Zn or Zn alloy coating or plating layer.

4. A cold-rolled steel sheet for hot pressing, comprising: a chemical composition containing (consisting of), by mass %, C: 0.28% or more and less than 0.42%, Si: 1.5% or less, Mn: 1.0% or more and 2.4% or less, P: 0.05% or less, S: 0.005% or less, Al: 0.01% or more and 0.50% or less, N: 0.005% or less, Nb: 0.005% or more and 0.15% or less, Ti: 0.005% or more and 0.15% or less, and B: 0.0005% or more and 0.0050% or less, where among the components of the member, C, Si, Nb, Ti, N, and B satisfy the following Expression (1), $$(Nb+(Ti-3.4N)+100B)/((C/8)+Si) \geq 0.25 \quad (1)$$

where each element symbol represents the content by mass % of the corresponding element, with the balance being Fe and inevitable impurities; a microstructure which contains 10% or more by volume fraction of martensite having an average grain aspect ratio of 2.5 or less and 5% or more by volume fraction of bainite having an average grain size of 6 µm or less, and at least 20 Nb-based and Ti-based precipitates having a grain size of less than 0.10 µm present on average per 100 µm² of a cross section parallel to a thickness direction of the steel sheet within a range of 100 µm in the thickness direction from a surface of the steel sheet.

5. The cold-rolled steel sheet for hot pressing according to 4., wherein the chemical composition further contains, by mass %, at least one selected from Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

6. The cold-rolled steel sheet for hot pressing according to 4. or 5., wherein the steel sheet comprises on a surface thereof an Al or Al alloy coating or plating layer or a Zn or Zn alloy coating or plating layer.

7. A method for manufacturing the cold-rolled steel sheet for hot pressing as recited in 4., the method comprising: preparing a steel raw material comprising a chemical composition containing (consisting of), by mass %, C: 0.28% or more and less than 0.42%, Si: 1.5% or less, Mn: 1.0% or more and 2.4% or less, P: 0.05% or less, S: 0.005% or less, Al: 0.01% or more and 0.50% or less, N: 0.005% or less, Nb: 0.005% or more and 0.15% or less, Ti: 0.005% or more and 0.15% or less, and B: 0.0005% or more and 0.0050% or less, where among the components of the member, C, Si, Nb, Ti, N, and B satisfy the following Expression (1), $$(Nb+(Ti-3.4N)+100B)/((C/8)+Si) \geq 0.25 \quad (1)$$

where each element symbol represents the content by mass % of the corresponding element, with the balance being Fe and inevitable impurities; hot rolling the steel raw material to obtain a hot-rolled steel sheet; after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature; after the primary cooling, subjecting the steel sheet to secondary cooling whereby the steel sheet is coiled at a coiling temperature of 550° C. or lower at a second average cooling rate of 5° C./s to 50° C./s up to the coiling temperature; then pickling and cold rolling the coiled hot-rolled steel sheet to obtain a cold-rolled steel sheet; and then subjecting the steel sheet to an annealing treatment whereby the steel sheet is heated to a first soaking temperature range of 800° C. to 900° C. at an average heating rate of 3° C./s to 30° C./s, held in the soaking temperature range for 15 seconds or longer, cooled to a cooling end temperature range of 200° C. to 350° C. at a third average cooling rate of 3° C./s or higher up to a cooling end temperature, then heated to a second soaking temperature range of 350° C. to 450° C., held in the second soaking temperature range for 120 seconds or longer, and then cooled to room temperature.

8. The method for manufacturing the cold-rolled steel sheet for hot pressing according to 7., wherein the chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

9. The method for manufacturing the cold-rolled steel sheet for hot pressing according to 7. or 8., the method further comprising: after the annealing treatment, applying an Al or Al alloy coating or plating treatment or a Zn or Zn alloy coating or plating treatment to a surface of the cold-rolled steel sheet.

10. A method for manufacturing a hot-pressed member, comprising: heating the cold-rolled steel sheet for hot pressing as recited in any one of 4. to 6. in a temperature range of an $Ac_3$ transformation temperature to 1000° C.; and then hot pressing the steel sheet.

Advantageous Effect

According to the present disclosure, it is possible to obtain a hot-pressed member which has extremely high tensile strength after hot pressing and also has excellent resistance to resistance welding cracking. For example, it is possible to stably obtain a hot-pressed member which is excellent in tensile shear stress and in resistance to resistance welding cracking, and which has a tensile strength of 1780 MPa or more, and in which resistance welding cracking does not occur even when the electrodes are used for welding at an angle with respect to the steel sheet.

Further, according to the present disclosure, it is possible to obtain a hot-pressed member with stable properties even under hot pressing conditions with large variations at the time of heating.

DETAILED DESCRIPTION

The following provides the details of the present disclosure.

First, the microstructures of the hot-pressed member and the cold-rolled steel sheet for hot pressing according to the present disclosure will be described in detail.

[Microstructure of Hot-Pressed Member]

The microstructure of the hot-pressed member is a microstructure such that a prior austenite average grain size is 7.5 µm or less, a volume fraction of martensite is 95% or more, and at least 10 Nb-based and Ti-based precipitates having a grain size of less than 0.10 µm are present on average per 100 µm$^2$ of a cross section parallel to the thickness direction of the member within a range of 100 µm in the thickness direction from the surface of the member, and such that a B concentration in prior austenite grain boundaries is at least 3.0 times a B concentration at a position 5 nm away from the grain boundaries.

When the prior austenite average grain size is more than 7.5 µm after hot pressing, the toughness after resistance welding decreases, and thus the resistance to resistance welding cracking deteriorates. Therefore, the prior austenite average grain size is 7.5 µm or less. It is preferably 7.0 µm or less. In addition, when the volume fraction of martensite is less than 95%, it is difficult to achieve the desired tensile strength. Therefore, the volume fraction of martensite is 95% or more. It may be 100%.

If the number of Nb-based and Ti-based precipitates having a grain size of less than 0.10 µm present per 100 µm$^2$ of the cross section parallel to the thickness direction of the member within a range of 100 µm in the thickness direction from the surface of the member after being subjected to hot pressing is less than 10, the austenite grains become coarsened in the middle of reverse transformation to austenite single phase during resistance welding, and when Zn enters into austenite grain boundaries, the toughness deteriorates upon application of tensile stress is deteriorated, resulting in lower resistance to resistance welding cracking. Therefore, at least 10 Nb-based and Ti-based precipitates having a grain size of less than 0.10 µm should be present on average per 100 µm$^2$ of the cross section parallel to the thickness direction of the member. The number of such Nb-based and Ti-based precipitates is preferably 15 or more.

Here, examples of Nb carbonitrides include NbC, NbN, Nb(C,N), and the like, and examples of Ti carbonitrides include TiC, TiN, Ti(C,N), and the like.

The cross section parallel to the thickness direction of the member to be measured is not particularly limited, and may be taken at any position.

Furthermore, if the B concentration in prior austenite grain boundaries is less than 3.0 times the B concentration at a position 5 nm away from the grain boundaries, the austenite grains become coarse during reverse transformation to austenite single phase during resistance welding, Zn enters into austenite grain boundaries, and the toughness upon application of tensile stress decreases, causing deterioration of the resistance to resistance welding cracking. Therefore, the B concentration in prior austenite grain boundaries is 3.0 times or more the B concentration at a position 5 nm away from the grain boundaries. Preferably, it is 6.0 times or more.

[Microstructure of Cold-Rolled Steel Sheet for Hot Pressing]

In order to obtain desired properties as a hot press member, it is important to control the microstructure of the cold-rolled steel sheet for hot pressing. That is, the microstructure of the cold-rolled steel sheet for hot pressing is a microstructure a microstructure which contains 10% or more by volume fraction of martensite having an average grain aspect ratio of 2.5 or less and 5% or more by volume fraction of bainite having an average grain size of 6 µm or less, and at least 20 Nb-based and Ti-based precipitates having a grain size of less than 0.10 µm present on average per 100 µm$^2$ of a cross section parallel to a thickness direction of the steel sheet within a range of 100 µm in the thickness direction from a surface of the steel sheet.

In the-cold rolled steel sheet for hot pressing, when the average grain aspect ratio of martensite grains exceeds 2.5, the desired prior austenite grain size can not be obtained after hot pressing, the diffusion of B becomes insufficient, and a desired ratio of intergranular and intragranular B concentrations can not be obtained, resulting in lower resistance to resistance welding cracking. The same is true when the volume fraction of martensite is less than 10%, and it is necessary to contain 10% or more by volume fraction of martensite having an average aspect ratio of 2.5 or less. The volume fraction of such martensite is preferably 15% or more. The upper limit of the volume fraction of martensite is not particularly limited, yet about 50% is preferable.

In addition, even if the average grain size of bainite is more than 6 µm or the bainite content is less than 5% by volume fraction, the desired prior austenite grain size can not be obtained after hot pressing, the diffusion of B becomes insufficient, and a desired ratio of intergranular and intragranular B concentrations can not be obtained, resulting in lower resistance to resistance welding cracking. Therefore, the volume fraction of bainite having an average grain size of 6 µm or less is 5% or more. Preferably, it is 10% or more. The upper limit of the volume fraction of bainite is not particularly limited, yet about 40% is preferable.

Furthermore, if the number of Nb-based and Ti-based precipitates having a grain size of less than 0.10 µm present per 100 µm$^2$ of the cross section parallel to the thickness direction of the cold-rolled steel sheet within a range of 100 µm in the thickness direction from the surface of the cold-rolled steel sheet after being subjected to hot pressing is less than 20, it is difficult to obtain at least 10 Nb-based and Ti-based precipitates having a grain size of less than 0.10 µm on average per 100 µm$^2$ of a cross section parallel to the thickness direction within a range of 100 µm in the thickness direction from the surface of the member, and the resistance to resistance welding cracking deteriorates. Therefore, at least 20 Nb-based and Ti-based precipitates having a grain size of less than 0.10 µm should be present on average per 100 µm$^2$ of the cross section parallel to the thickness direction of the steel sheet. Preferably, the number of such Nb-based and Ti-based precipitates is 30 or more.

In addition, no particular limitation is placed on the cross section parallel to the thickness direction of the steel sheet to be measured, and a so-called C or L cross section may be used.

Next, appropriate compositional ranges of the hot-pressed member and the cold-rolled steel sheet for hot pressing according to the present disclosure will be described. When components are expressed in "%", this refers to "mass %".

C: 0.28% or More and Less than 0.42%

C is an element effective for increasing the strength of the steel, and is an important element for strengthening martensite after hot pressing to increase the strength of the steel. However, if the C content is less than 0.28%, the hardness of martensite after hot pressing is insufficient, and a tensile strength of 1780 MPa or more can not be obtained. The C content is preferably 0.30% or more. On the other hand, when C is added by 0.42% or more, the hardness after resistance spot welding increases, the toughness decreases, and the resistance to resistance welding cracking decreases. Therefore, the C content is less than 0.40%. Preferably, it is less than 0.39%.

Si: 1.5% or Less

Si is an element effective for solid solution strengthening of ferrite and increasing the strength. However, excessive addition of Si causes a relative decrease in intergranular strength as compared with intragranular strength during resistance spot welding, with the result that Zn enters into the grain boundaries and embrittlement easily occurs and that the alloying behavior of the molten Zn changes, causing deterioration of the resistance to resistance welding cracking. Therefore, the Si content is 1.5% or less. It is preferably 1.2% or less, and more preferably 0.8% or less. Although the lower limit of the Si content is not particularly specified, it is preferable to set it at 0.005% because making the Si content extremely low leads to an increase in cost.

Mn: 1.0% or More and 2.4% or Less

Mn is an element that increases the quench hardenability during hot pressing, and thus contributes to the formation of martensite after hot pressing, that is, the increase in strength. To obtain this effect, the Mn content needs to be 1.0 or more. Preferably, it is 1.2% or more. However, when Mn is excessively added, tempering of martensite in HAZ after resistance welding becomes insufficient and the toughness of HAZ deteriorates, resulting in lower resistance to resistance welding cracking. Therefore, the Mn content is 2.4% or less. Preferably, it is 2.0% or less.

P: 0.05% or Less

P contributes to the increase in strength by solid solution strengthening. However, when added excessively, segregation of P at grain boundaries becomes remarkable, the grain boundaries are embrittled, and the resistance to resistance welding cracking is lowered. Therefore, the P content is 0.05% or less. Preferably, it is 0.04% or less. Although the lower limit of the P content is not particularly specified, it is preferable to set it at 0.0005% because making the P content extremely low leads to an increase in steelmaking cost.

S: 0.005% or Less

When the S content is high, a large amount of sulfides such as MnS is formed, and the resistance to resistance welding cracking deteriorates. Therefore, an upper limit of the S content is 0.005%. Preferably, it is 0.0045% or less. Although the lower limit of the S content is not particularly specified, it is preferable to set it at 0.0002% because, as is the case with P, making the S content extremely low leads to an increase in steelmaking cost.

Al: 0.01% or More and 0.50% or Less

Al is an element necessary for deoxidation. To obtain this effect, the Al content needs to be 0.01% or more. On the other hand, adding Al beyond 0.50% does not increase this effect. Therefore, the Al content is 0.50% or less. Preferably, it is 0.40% or less.

N: 0.005% or Less

Since N forms a coarse nitride with Ti and degrades the resistance to resistance welding cracking, it is necessary to suppress the content. In particular, when the N content exceeds 0.005%, this tendency becomes remarkable. Therefore, the N content is 0.005% or less. Preferably, it is 0.004% or less and more preferably 0.0035% or less.

Nb: 0.005% or More and 0.15% or Less

Nb is an element that contributes to the increase in strength by forming fine carbonitrides. Furthermore, in the present disclosure, since fine Nb-based precipitates refine the austenite grain size during hot pressing, and even after resistance spot welding, this refinement is maintained and the toughness is improved, improving the resistance to resistance welding cracking. To obtain this effect, the Nb content needs to be 0.005% or more. On the other hand, adding a large amount of Nb fails to further increase the above effect, but instead increases the cost. Therefore, the Nb content is 0.15% or less. It is preferably 0.12% or less, and more preferably 0.10% or less.

Ti: 0.005% or More and 0.15% or Less

Ti, like Nb, is an element that contributes to the increase in the resistance to resistance welding cracking. Furthermore, when B, which is an essential element in the present disclosure, is added, Ti is also necessary to prevent B from reacting with N. To obtain this effect, the Ti content needs to be 0.005% or more. On the other hand, when a large amount of Ti is added, the elongation after hot pressing is significantly reduced. Therefore, the Ti content is 0.15% or less. Preferably, it is 0.12% or less.

B: 0.0005% or More and 0.0050% or Less

B is an element that increases the quench hardenability during hot pressing, and thus contributes to the formation of martensite after hot pressing, that is, the increase in strength. B also improves the grain boundary strength by segregation at grain boundaries, it is effective for increasing the resistance to resistance welding cracking. To obtain this effect, the B content needs to be 0.0005% or more. However, since excessive addition of B does not increase the effect, the B content is set to 0.0050% or less.

Further, in the present disclosure, it is preferable that among the components, C, Si, Nb, Ti, N, and B satisfy the following Expression (1):

$$(Nb+(Ti-3.4N)+100B)/((C/8)+Si) \geq 0.25 \qquad (1),$$

where each element symbol represents the content by mass % of the corresponding element, and for any element not contained, it is calculated as zero.

The above expression is an index for securing resistance to resistance welding cracking. When the value on the left side is less than 0.25, it may be difficult to ensure the resistance to resistance welding cracking.

In the present disclosure, the following components may be appropriately contained.

Mo: 0.50% or Less

Mo is an element that increases the quench hardenability during hot pressing, and thus contributes to the formation of martensite after hot pressing, that is, the increase in strength. To obtain this effect, the Mo content is preferably 0.005% or more. It is more preferably 0.01% or more. On the other hand, even if a large amount of Mo is added, the above effect is saturated, leading to an increase in cost, and causing deterioration of the chemical conversion treatment property. Therefore, the Mo content is preferably 0.50% or less.

Cr: 0.50% or Less

Cr, like Mo, is an element that increases the quench hardenability during hot pressing, and thus contributes to the formation of martensite after hot pressing, that is, the increase in strength. To obtain this effect, the Cr content is preferably 0.005% or more. It is more preferably 0.01% or more. On the other hand, even if a large amount of Cr is added, the above effect is saturated, and a surface oxide is formed, deteriorating the coatability. Therefore, the Cr content is preferably 0.50% or less.

Sb: 0.001% or More and 0.020% or Less

Sb has the effect of suppressing the formation of a decarburized layer in a surface layer part of a steel sheet before heating of the steel sheet prior to hot pressing and subsequent cooling through a series of processes of hot pressing. Accordingly, the hardness distribution of the sheet surface becomes uniform, and the resistance to resistance welding cracking is improved. To obtain this effect, the Sb content is preferably 0.001% or more. On the other hand, if Sb is added in excess of 0.020%, the rolling load increases and the productivity decreases. Therefore, the Sb content is preferably 0.020% or less.

Ca: 0.005% or Less, Mg: 0.005% or Less, REM: 0.005% or Less

Ca, Mg, and REM control the shapes of sulfides and oxides, and suppress the formation of coarse inclusions, thereby improving the resistance to resistance welding cracking. To obtain this effect, it is preferable to add each element in an amount of 0.0005% or more. However, excessive addition causes an increase in inclusions and deterioration of the resistance to resistance welding cracking. Therefore, the content of each added element is preferably 0.005% or less. Here, REM is an element containing Sc, Y, and lanthanoid elements.

V: 0.15% or Less

V is an element that contributes to the increase in strength by forming a fine carbonitride. To obtain this effect, the V content is preferably 0.01% or more. On the other hand, since adding a large amount of V lowers the toughness at the time of resistance welding and reduces the resistance to resistance welding cracking. Therefore, the V content is preferably 0.15% or less. It is more preferably 0.10% or less.

Cu: 0.50% or Less

Cu can be added as needed because not only does it contribute to the increase in strength by solid solution strengthening, but it improves the corrosion resistance and thus can improve the delayed fracture resistance. To obtain these effects, the Cu content is preferably 0.05% or more. On the other hand, if Cu is added in excess of 0.50%, the effect is saturated and surface defects resulting from Cu tend to occur more frequently. Therefore, the Cu content is preferably 0.50% or less.

Ni: 0.50% or Less

Similarly to Cu, Ni can also be added as needed because it can improve the delayed fracture resistance by improving the corrosion resistance. Moreover, when added simultaneously with Cu, Ni has the effect of suppressing surface defects caused by Cu. Thus, when Cu is added, addition of Ni is effective. To obtain these effects, the Ni content is 0.05% or more. However, since adding a large amount of Ni lowers the toughness at the time of resistance welding and reduces the resistance to resistance welding cracking. Therefore, the Ni content is preferably 0.50% or less.

Sn: 0.50% or Less

Similarly to Cu and Ni, Sn can also be added as needed because it can improve the delayed fracture resistance by improving the corrosion resistance. To obtain these effects, the Sn content is 0.05% or more. However, the addition of a large amount of Sn lowers the toughness at the time of resistance welding and reduces the resistance to resistance welding cracking. Therefore, the Sn content is preferably 0.50% or less.

Zn: 0.10% or Less

Zn is an element that contributes to the formation of martensite after hot pressing, and thus contributes to the formation of martensite after hot pressing, that is, the increase in strength. To obtain these effects, the Zn content is preferably 0.005% or more. However, the addition of a large amount of Zn lowers the toughness at the time of resistance welding and reduces the resistance to resistance welding cracking. Therefore, the Zn content is preferably 0.10% or less.

Co: 0.10% or Less

Similarly to Cu and Ni, Co can also be added as needed because it can improve the delayed fracture resistance as it increases the corrosion resistance by improving the hydrogen overvoltage. To obtain these effects, the Co content is preferably 0.005% or more. However, the addition of a large amount of Co lowers the toughness at the time of resistance welding and reduces the resistance to resistance welding cracking. Therefore, the Co content is preferably 0.10% or less.

Zr: 0.10% or Less

Similarly to Cu and Ni, Zr can also be added as needed because it can improve the delayed fracture resistance by improving the corrosion resistance. To obtain these effects, the Zr content is preferably 0.005% or more. However, the addition of a large amount of Zr lowers the toughness at the time of resistance welding and reduces the resistance to resistance welding cracking. Therefore, the Zr content is preferably 0.10% or less.

Ta: 0.10% or Less

Ta, like Ti, forms alloy carbides and alloy nitrides and contributes to the increase in strength. To obtain this effect, the Ta content is preferably 0.005% or more. Excessively adding Ta, however, fails to increase the addition effect, but instead results in a rise in alloying cost. Therefore, the Ta content is preferably 0.10% or less.

W: 0.10% or Less

Similarly to Cu and Ni, W can also be added as needed since it can improve the delayed fracture resistance by improving the corrosion resistance. To obtain these effects, the W content is preferably 0.005% or more. However, since adding a large amount of W lowers the toughness at the time of resistance welding and reduces the resistance to resistance welding cracking. Therefore, the W content is preferably 0.10% or less.

The balance other than the above is Fe and inevitable impurities.

Next, the cold-rolled steel sheet for hot pressing and the coating or plating layer of the hot-pressed member according to the present disclosure will be described in detail.

[Coating or Plating Layer of Cold-Rolled Steel Sheet for Hot Pressing]

The cold-rolled steel sheet for hot pressing disclosed herein may be a cold-rolled steel sheet to which a coating or plating layer is not applied, yet in order to prevent oxidation by hot pressing or to improve corrosion resistance, a coating or plating layer may be applied onto the surface of the cold-rolled steel sheet before being subjected to hot pressing.

As a coating or plating layer to be applied onto the surface of the cold-rolled steel sheet for hot pressing according to the present disclosure, an Al or Al alloy coating or plating layer or a Zn or Zn alloy coating or plating layer is suitable. Applying such coating or plating layer onto the surface of the cold-rolled steel sheet for hot pressing prevents oxidation of the surface of the steel sheet by hot pressing, and the corrosion resistance of the hot-pressed member is further improved.

Examples of the Al or Al alloy coating or plating layer include an Al—Si coating layer formed by hot dip coating. In addition, examples of the Zn or Zn alloy coating or plating layer include a hot-dip galvanizing layer formed by hot dip coating, a galvannealing layer formed by alloying it, a Zn electroplating layer formed by electroplating, and a Zn—Ni alloy electroplating layer.

However, the Al or Al alloy coating or plating layer or the Zn or Zn alloy coating or plating layer is not limited to the above-described coating or plating layers, and may be a coating or plating layer which contains at least one of Si, Mg, Ni, Fe, Co, Mn, Sn, Pb, Be, B, P, S, Ti, V, W, Mo, Sb, Cd, Nb, Cr, and Sr in addition to the main component, Al or Zn. The method for forming the Al or Al alloy coating or plating layer or the Zn or Zn alloy coating or plating layer is not limited to the disclosed method at all, and any known hot dip coating, electroplating, vapor deposition plating, or the like is applicable. The Al or Al alloy coating or plating layer or the Zn or Zn alloy coating or plating layer may be a coating or plating layer subjected to an alloying treatment after the coating or plating step.

In the present disclosure, in particular, it is more preferable that the Zn or Zn alloy coating or plating layer is a Zn—Ni alloy coating or plating layer in order to further improve the corrosion resistance of the hot-pressed member or to prevent liquid metal embrittlement cracking caused by molten Zn during hot press forming.

The coating weight of the coating or plating layer is not particularly limited, and may be set in a general manner. For example, it is preferable to have a coating or plating layer with a coating weight of 5 $g/m^2$ to 150 $g/m^2$ per surface. If the coating weight is less than 5 $g/m^2$, it may be difficult to ensure corrosion resistance, while if it exceeds 150 $g/m^2$, the resistance to coating or plating exfoliation may deteriorate.

[Coating or Plating Layer of Hot-Pressed Member]

When a cold-rolled steel sheet for hot pressing to which an Al or Al alloy coating or plating layer or a Zn or Zn alloy coating or plating layer is applied is heated and then hot-pressed, some or all of the coating or plating layer components contained in the Al or Al alloy coating or plating layer or the Zn or Zn alloy coating or plating layer diffuse into the base steel sheet to form a solid solution phase or an intermetallic compound, and at the same time, conversely, Fe which is a component of the base steel sheet diffuses into the Al or Al alloy coating or plating layer or the Zn or Zn alloy coating or plating layer to form a solid solution phase or an intermetallic compound. Further, an oxide layer containing Al is formed on the surface of the Al or Al alloy coating of plating layer, and an oxide layer containing Zn is formed on the surface of the Zn or Zn alloy coating or plating layer.

As an example, when an Al—Si coating or plating layer is heated, it changes to a coating or plating layer mainly composed of an Fe—Al intermetallic compound containing Si. Further, when a hot-dip galvanizing layer, a galvannealing layer, a Zn electroplating layer, and the like are heated, an FeZn solid solution phase in which Zn is dissolved in Fe, a ZnFe intermetallic compound, a ZnO layer in the surface layer, and the like are formed. Furthermore, when the Zn—Ni alloy electroplating layer is heated, a solid solution layer containing Ni in which a coating or plating layer component is dissolved in Fe, an intermetallic compound mainly composed of ZnNi, a ZnO layer in the surface layer, and the like are formed.

As used herein, as described above, a coating or plating layer containing Al formed by heating a cold-rolled steel sheet for hot pressing to which an Al or Al alloy coating or plating layer is applied is referred to as an Al or Al alloy coating or plating layer, and a coating or plating layer containing Zn formed by heating a cold-rolled steel sheet for hot pressing to which a Zn or Zn alloy coating or plating layer is applied is referred to as a Zn or Zn alloy coating or plating layer.

Next, a preferred method for manufacturing the cold-rolled steel sheet for hot pressing according to the present disclosure will be described.

In the present disclosure, in the production of the above-described cold-rolled steel sheet, at first, a steel material (slab) having the above-described predetermined composition is hot rolled to obtain a hot-rolled steel sheet, and then subjected to primary cooling whereby the hot-rolled steel sheet is cooled to a cooling end temperature of 700° C. or lower at a first average cooling rate of 70° C./s or higher up to the cooling end temperature.

After the primary cooling, the steel sheet is subjected to secondary cooling whereby the steel sheet is coiled at a coiling temperature of 550° C. or lower at a second average cooling rate of 5° C./s to 50° C./s up to the coiling temperature.

Then, the coiled hot-rolled steel sheet is pickled, and then cold rolled to obtain a cold-rolled steel sheet. Then, the cold-rolled steel sheet is subjected to an annealing treatment whereby the cold-rolled steel sheet is heated to a first soaking temperature range of 800° C. to 900° C. at an average heating rate of 3° C./s to 30° C./s, held in the soaking temperature range for 15 seconds or longer, cooled to a cooling end temperature range of 200° C. to 350° C. at a third average cooling rate of 3° C./s or higher up to a cooling end temperature, then heated to a second soaking temperature range of 350° C. to 450° C., held in the second soaking temperature range for 120 seconds or longer, and then cooled to room temperature.

Hereinafter, the above manufacturing method will be described in detail for each step.

[Heating]

For a steel slab as a raw material after being cast, it is preferable to start hot rolling either at 1150° C. to 1270° C. directly after casting without reheating or after reheating to 1150° C. to 1270° C. Under preferred conditions for hot rolling, at first, a steel slab is hot rolled at a hot rolling start temperature of 1150° C. to 1270° C.

In the present disclosure, after a steel slab is prepared, in addition to a conventional method in which a steel slab is first cooled to room temperature and then reheated, an energy saving process is also applicable without any problem, such as hot direct rolling or direct rolling, in which a steel slab is charged into a heating furnace as a warm slab without being cooled, in which a steel slab is rolled immediately after heat retention, or in which a steel slab is rolled directly after casting.

[Hot Rolling]

The hot rolling needs to be finished in the austenite single phase region in order to improve elongation and hole expansion formability after annealing by increasing the uniformity of the microstructure of the steel sheet and reducing the anisotropy of the material property. Therefore, the finisher delivery temperature is preferably 850° C. or higher. On the other hand, when the finisher delivery temperature exceeds 1000° C., the hot-rolled microstructure becomes coarse, and the properties after annealing are also degraded. Therefore, the finisher delivery temperature is preferably 1000° C. or lower.

[Primary Cooling]

Cooling to 700° C. or lower at a first average cooling rate of 70° C./s or higher The austenite undergoes ferrite transformation during the cooling process after the end of the hot rolling. However, since the ferrite coarsens at high temperatures, quenching is performed after the end of the hot rolling to homogenize the microstructure as much as possible, while at the same time suppressing generation of Nb-based and Ti-based precipitates. Accordingly, at first, as primary cooling, cooling is performed to a cooling end temperature of 700° C. or lower at an average cooling rate of 70° C./s or higher. If the first average cooling rate is lower than 70° C./s, the ferrite is coarsened, and the microstructure of the hot-rolled steel sheet becomes inhomogeneous, leading to a reduction in the resistance to resistance welding cracking. On the other hand, if the cooling end temperature in the primary cooling is higher than 700° C., pearlite is excessively formed in the microstructure of the hot-rolled steel sheet, the microstructure of the steel sheet eventually becomes heterogeneous, and the desired B distribution state can not be obtained, again leading to a reduction in the resistance to resistance welding cracking. The lower limit of the cooling end temperature in the primary cooling is preferably about 500° C.

[Secondary Cooling]

Cooling to 550° C. or lower at a second average cooling rate of 5° C./s to 50° C./s If the average cooling rate in this secondary cooling is lower than 5° C./s, ferrite or pearlite is excessively formed in the microstructure of the hot-rolled steel sheet, and the microstructure of the steel sheet eventually becomes heterogeneous, and Nb-based and Ti-based precipitates coarsen, leading to a reduction in the resistance to resistance welding cracking. On the other hand, if the average cooling rate in the secondary cooling exceeds 50° C./s, pearlite is excessively generated in the microstructure of the hot-rolled steel sheet such that the element distribution of C becomes uneven, and the desired B distribution state can not be obtained, causing deterioration of the resistance to resistance welding cracking. Furthermore, cooling to temperatures above 550° C. causes excessive formation of ferrite or pearlite in the microstructure of the hot-rolled steel sheet and coarsening of the Nb-based and Ti-based precipitates, again leading to a reduction in the resistance to resistance welding cracking.

[Coiling]

Coiling Temperature: 550° C. or Lower

If the coiling temperature is higher than 550° C., ferrite and pearlite are excessively formed in the microstructure of the hot-rolled steel sheet, and the microstructure of the steel sheet eventually becomes heterogeneous, leading to a reduction in the resistance to resistance welding cracking. To avoid this, it is important to perform coiling in a temperature range containing a large amount of bainite. In addition, when coiling is performed at high temperature, Nb-based and Ti-based precipitates coarsen, and the resistance to resistance welding cracking deteriorates. Therefore, in the present disclosure, the upper limit of the coiling temperature is 550° C. It is preferably 520° C. or lower. The lower limit of the coiling temperature is not particularly specified, yet if the coiling temperature is too low, hard martensite is excessively formed to increase the cold rolling load. Therefore, the lower limit is preferably 300° C. or higher.

[Pickling]

After the hot rolling, pickling is performed to remove scale from the surface of the hot-rolled sheet. The pickling treatment is not particularly limited and may be carried out according to a conventional method.

[Cold Rolling]

Cold rolling is performed to roll a steel sheet into a cold-rolled sheet having a predetermined thickness. The cold rolling is not particularly limited and may be carried out according to a conventional method.

[Annealing]

This annealing step is performed for the purpose of advancing recrystallization after cold rolling and controlling the precipitation of Nb and Ti after hot pressing and the distribution state of B. To this end, it is necessary to perform annealing separately in two stages of heat treatment whereby the steel sheet is heated to a temperature range of 800° C. to 900° C. (first soaking temperature range) at an average heating rate of 3° C./s to 30° C./s, held in the soaking temperature range for 15 seconds or longer, cooled to a cooling end temperature range of 200° C. to 350° C. at a third average cooling rate of 3° C./s or higher up to a cooling end temperature, then heated to a second soaking temperature range of 350° C. to 450° C., held in the second soaking temperature range for 120 seconds or longer, and then cooled to room temperature.

Average Heating Rate: 3° C./s to 30° C./s

Although heating is performed to a first soaking temperature described later, controlling the heating rate at this time enables refinement of crystal grains after annealing. The upper limit of the average heating rate is set to 30° C./s because recrystallization does not easily proceed if heating is performed rapidly. On the other hand, if the average heating rate is too low, martensite and bainite coarsen and a predetermined average grain size can not be obtained. Therefore, the lower limit of the average heating rate is 3° C./s. Preferably, it is 5° C./s or higher.

First soaking temperature: 800° C. to 900° C.

The first soaking temperature is in a temperature range which is a dual-phase range of ferrite and austenite or an austenite single-phase range. If the first soaking temperature is lower than 800° C., the ferrite fraction increases, and a desired volume fraction can not be obtained for martensite and bainite. Therefore, the lower limit of the soaking temperature is 800° C. On the other hand, if the soaking temperature is too high, crystal grain growth of austenite becomes remarkable, and in addition to coarsening of crystal grains, Nb-based and Ti-based precipitates become coarse. Therefore, the upper limit of the soaking temperature is 900° C. Preferably, it is 880° C. or lower.

Holding Time: 15 Seconds or Longer

In the above-described first soaking temperature range, a holding time of 15 seconds or longer is necessary for progress of recrystallization and austenite transformation of some or all of the microstructures. The upper limit is not particularly limited, yet is preferably 600 seconds or shorter.

Cooling to a cooling end temperature range of 200° C. to 350° C. at a third average cooling rate of 3° C./s or higher By cooling from the first soaking temperature to a temperature at or below the martensitic transformation start temperature, in order for austenite formed in the soaking zone to be partially transformed to martensite, cooling is performed at a cooling rate of 3° C./s or higher to a cooling end temperature range of 200° C. to 350° C. As a result, the subsequent bainite transformation can be promoted such that a desired volume fraction is obtained, and the coarsening of Nb-based and Ti-based precipitates can also be suppressed. If the third cooling rate is lower than 3° C./s on average, pearlite and spherical cementite are excessively formed in the microstructure of the steel sheet. Therefore, the lower limit of the third average cooling rate is 3° C./s. The upper limit of the third average cooling rate is not particularly limited, yet about 30° C./s is preferable.

In addition, if the cooling end temperature is lower than 200° C., martensite is excessively formed during cooling, untransformed austenite decreases, and the volume fraction of bainite decreases. On the other hand, if the cooling end temperature exceeds 350° C., bainite transformation is not promoted, and coarse martensite remains in the microstructure after annealing, a desired form of microstructure can not be obtained. Therefore, the cooling end temperature is 200° C. to 350° C. Preferably, it is 220° C. to 300° C.

Holding for 120 seconds or longer in the temperature range of 350° C. to 450° C. as a second soaking temperature In order to promote the bainite transformation by utilizing the martensite formed in the middle of the above tertiary cooling, the steel sheet is heated again after the cooling and is held in a temperature range of 350° C. to 450° C. for 120 seconds or longer. When the second soaking temperature is in a temperature range of below 350° C. or above 450° C., bainite transformation is not promoted, and coarse martensite is formed as a microstructure of the cold-rolled steel sheet. As a result, resistance to resistance welding cracking after hot pressing is reduced. In addition, if the holding time is shorter than 120 seconds, bainite transformation does not proceed sufficiently, and the resistance to resistance welding cracking decreases. Therefore, the holding time in the temperature range of 350° C. to 450° C. is 15 seconds or longer. Preferably, it is 20 seconds or longer. The upper limit of the holding time is not particularly limited, yet is preferably 7200 seconds or shorter.

In the above-described series of manufacturing steps, what are particularly important in the present disclosure are the primary cooling step, secondary cooling step, coiling step, and annealing step.

That is, by appropriately controlling the primary cooling step, secondary cooling step, and annealing step, the distribution state of Nb-based and Ti-based precipitates is improved, and at the same time the distribution state of B is simultaneously improved. As a result, not only at least 20 Nb-based and Ti-based precipitates having a grain size of less than 0.10 μm can be present on average per 100 μm$^2$ of a cross section parallel to the thickness direction of the steel sheet, and the B concentration in prior austenite grain boundaries after press forming can be 3.0 times or more the B concentration at a position 5 nm away from the grain boundaries. In addition, by appropriately controlling the coiling step and the annealing step, 5% or more by volume fraction of bainite having an average grain size of 6 μm or less can be obtained.

Thereafter, the cold-rolled steel sheet may be subjected to a coating or plating treatment such as hot-dip galvanizing, or used as it is without being subjected to such treatment.

[Coating or Plating]

The cold-rolled steel sheet for hot pressing disclosed herein may be used as the cold-rolled steel sheet manufactured by the above-described manufacturing process or, depending on the purpose, may be subjected to an Al or Al alloy coating or plating treatment or a Zn or Zn alloy coating or plating treatment to form an Al or Al alloy coating or plating layer or a Zn or Zn alloy coating or plating layer.

Such coating or plating treatment is not limited at all, and any known hot-dip coating, electroplating, vapor deposition plating, and the like can be applied. In addition, after the coating or plating treatment, an alloying treatment may be performed. For typical coating or plating treatments, examples of the Al or Al alloy coating or plating treatment include a treatment to apply hot-dip aluminum (Al) coating and a treatment to apply hot-dip Al—Si coating, and examples of zinc or zinc alloy coating or plating treatment include a treatment to apply hot-dip galvanizing or zinc-nickel electroplating and a treatment to apply hot-dip galvanizing followed by an alloying treatment.

Temper rolling may also be carried out on the cold-rolled steel sheet. In this case, a preferred elongation ratio is 0.05% to 2.0%.

Next, hot pressing performed on the obtained cold-rolled steel sheet will be described.

The method and conditions of hot pressing are not limited in any way, and all known hot pressing methods can be applied. Although one example is given below, the present disclosure is not so limited.

For example, a cold-rolled steel sheet for hot pressing as a raw material may be heated to a temperature range of an Ac$_3$ transformation temperature to 1000° C. using an electric furnace, a gas furnace, an electric heating furnace, a far infrared heating furnace, or the like, held in this temperature range for 0 seconds to 600 seconds, transported to a press, and subjected to hot pressing in a temperature range of 550° C. to 800° C. The heating rate at the time of heating the cold-rolled steel sheet for hot pressing may be 3° C./s to 200° C./s.

Here, the Ac$_3$ transformation temperature can be determined by:

$$Ac_3 \text{ transformation temperature (° C.)}=881-206C+53Si-15Mn-20Ni-1Cr-27Cu+41Mo$$

Where each element symbol represents the content by mass % of the corresponding element. For any element not contained, it is calculated as zero.

Examples

The following describes examples according to the disclosure.

The present disclosure is by no means limited by the examples described below, and can be implemented with appropriate modifications without departing from the spirit of the present disclosure. All such modifications are encompassed by the technical scope of the present disclosure.

Steels having the chemical compositions listed in Table 1 were prepared by steelmaking and cast into slabs, then heated to 1250° C., and then subjected to hot rolling under the conditions listed in Table 2 for the finisher delivery temperature (FDT). Then, each hot-rolled steel sheet is cooled to a cooling end temperature (first cooling temperature) at a first average cooling rate (Cooling Rate 1) listed in Table 2, then cooled to a coiling temperature (CT) at a second average cooling rate (Cooling Rate 2), and then wound in a coil form.

Then, each hot-rolled sheet thus obtained was pickled, and then cold rolled with a rolling reduction listed in Table 2 to obtain a cold-rolled sheet (sheet thickness: 1.4 mm).

Then, each cold-rolled steel sheet thus obtained was subjected to an annealing treatment under the conditions listed in Table 2 in a continuous annealing line (CAL) or a continuous galvanizing line (CGL), and cold-rolled steel sheets (CR) were obtained for those having passed through CAL and hot-dip galvanized steel sheets (GI) were obtained for those having passed through CGL. Note that some of the steel sheets having passed through CGL were subjected to a hot-dip galvanization treatment, followed by an alloying treatment at 550° C., to obtain galvannealed steel sheets (GA). In addition, a hot-dip aluminum coating treatment was performed to obtain a hot-dip aluminum coated steel sheet (AS). Furthermore, some were partially annealed in CAL, and zinc-nickel electroplated steel sheets (EZN) were obtained in an electrogalvanizing line (EGL).

For comparison, with respect to some of the samples, two-stage annealing was not performed after cold rolling, but single-stage annealing was performed.

Then, hot pressing was performed on the obtained cold-rolled steel sheets (including those subjected to coating or plating) under the conditions listed in Table 3.

The mold used in the hot pressing had a punch width of 70 mm, a punch shoulder radius of 4 mm, and a die shoulder radius of 4 mm, and the forming depth was 30 mm. Heating of each cold-rolled steel sheet was performed in the atmosphere using either an infrared heating furnace or an atmosphere heating furnace depending on the heating rate. In addition, cooling after pressing was performed by combining sandwiching of each steel sheet between the punch and the die with air cooling on the die released from the sandwiching, and each steel sheet was cooled from the press (start) temperature to 150° C. At this time, the cooling rate was adjusted by changing the holding time of the punch at the bottom dead center in a range of 1 second to 60 seconds.

A JIS No. 5 tensile test specimen was collected from the position of the hat bottom portion of each hot-pressed member thus obtained, and a tensile test was performed according to JIS Z 2241 to measure the tensile strength (TS).

For resistance welding cracking test, resistance welding (spot welding) was performed using a test specimen cut into 50 mm×150 mm from the hat bottom portion of each obtained hot-pressed member. As a sheet combination to be welded, a sheet combination in which the hot-pressed member and a GA steel sheet of 980 MPa grade were stacked was used. The welding was performed by resistance spot welding using a resistance welding machine of servomotor pressure type at single phase direct current (50 Hz) attached to a welding gun on a sheet combination in which two steel sheets were stacked, with the sheet combination inclined by 4°. The welding conditions were a pressure of 4.5 kN and a hold time of 0.3 seconds. The welding current and welding time were adjusted such that the nugget diameter was 6.0 mm. After welding, the test specimen was cut in half, and a cross section parallel to the thickness direction was observed under an optical microscope, and those with cracks of 0.2 mm or larger were judged as being poor in resistance to resistance welding cracking ("Poor"), those with cracks of 0.1 mm or larger and smaller than 0.2 mm as being fair in resistance to resistance welding cracking ("Fair"), or those with no cracks or cracks of smaller than 0.1 mm (i.e., without cracks of 0.1 mm or larger) as being good in resistance to resistance welding cracking ("Good").

To determine the volume fraction of martensite of the cold-rolled steel sheet after being annealed and the member after being subjected to hot pressing, a cross section parallel to the rolling direction and the thickness direction of the steel sheet was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction.

Further, for both cold-rolled steel sheets and hot-pressed members, to determine the grain size of Nb-based and Ti-based precipitates, a cross section parallel to the thickness direction was observed at 10 locations of 0.5 µm×0.5 µm under a transmission electron microscope (TEM) at 10000 times magnification, and the equivalent circle diameter was calculated using Image-Pro available from Media Cybernetics with a lower limit of 0.005 µm to determine the grain size. To determine the number of Nb-based and Ti-based precipitates having a grain size of less than 0.10 µm, the cross section was observed at 10 locations of 0.5 µm×0.5 µm under a transmission electron microscope (TEM) at 10000 times magnification, and the average number density of these 10 locations was obtained. In this method, it was possible to count Nb-based and Ti-based precipitates having a grain size of 0.005 µm or more.

The distribution state of B of each hot-pressed member was observed at 1,000,000 times magnification using a STEM available from FEI, line analysis of 15 nm centering on a prior austenite grain boundary was performed to determine the B concentration (at. %) at each location, and the ratio of the B concentration in the prior austenite grain boundary to the B concentration at a portion 5 nm away from the grain boundary was measured.

To determine the prior austenite average grain size in each hot-pressed member, a cross section parallel to the rolling direction and the thickness direction of each steel sheet was polished, treated by corrosion with 3 vol % nital, and observed under a scanning electron microscope (SEM) at 3000 times magnification, and using Image-Pro available from Media Cybernetics, the circle equivalent diameters of prior austenite grains were calculated, and the results were averaged.

To determine the average aspect ratio of martensite in each cold-rolled steel sheet after being subjected to annealing, a cross section parallel to the rolling direction and the thickness direction of each steel sheet was polished, treated by corrosion with 3 vol % nital, observed at 3000 times magnification under a scanning electron microscope (SEM), and the aspect ratio (the major axis length/the minor axis length) of martensite was determined, and the results were averaged.

To determine the average grain size and the volume fraction of bainite in each cold-rolled steel sheet after being subjected to annealing, a cross section parallel to the rolling direction and the thickness direction of each steel sheet was polished, treated by corrosion with 3 vol % % nital, and observed at 3000 times magnification under a scanning electron microscope (SEM), and the area ratio was measured by a point count method (in accordance with ASTM E562-83 (1988)), and the measured area ratio was used as the volume fraction. To determine the average grain size of martensite, using Image-Pro available from Media Cybernetics, the circle equivalent diameters of bainite were calculated from the microstructural micrographs of each steel sheet (taken at 10 locations of 20 µm×20 µm at 3000 times magnification), and the results were averaged.

The microstructures of the cold-rolled steel sheets and the hot-pressed members thus obtained are listed in Table 4. In addition, Table 5 lists the measurement results of the tensile properties and the resistance to resistance welding cracking of the hot-pressed members.

TABLE 1

| Steel ID | Chemical composition (mass %) | | | | | | | | | | | Expression (1) |
|---|---|---|---|---|---|---|---|---|---|---|---|---|
| | C | Si | Mn | P | S | Al | N | Nb | Ti | B | Others | |
| A | 0.35 | 0.25 | 1.82 | 0.01 | 0.001 | 0.03 | 0.002 | 0.023 | 0.033 | 0.0015 | — | 0.68 |
| B | 0.33 | 0.43 | 1.55 | 0.01 | 0.001 | 0.03 | 0.002 | 0.035 | 0.022 | 0.0021 | Cr: 0.23, Sb: 0.009 | 0.55 |
| C | 0.29 | 1.08 | 1.57 | 0.01 | 0.001 | 0.02 | 0.003 | 0.031 | 0.031 | 0.0032 | Mo: 0.24, Cu: 0.12, Sn: 0.06, Zr: 0.02 | 0.33 |
| D | 0.32 | 0.72 | 1.88 | 0.02 | 0.001 | 0.02 | 0.002 | 0.029 | 0.021 | 0.0019 | V: 0.02, Ni: 0.19, Zn: 0.02, W: 0.01 | 0.31 |
| E | 0.38 | 0.22 | 1.44 | 0.01 | 0.002 | 0.03 | 0.002 | 0.019 | 0.019 | 0.0023 | Co: 0.02, Ta: 0.03, Ca: 0.001 | 0.98 |
| F | 0.31 | 0.33 | 1.73 | 0.01 | 0.002 | 0.03 | 0.002 | 0.022 | 0.030 | 0.0019 | Ca: 0.001, Mg: 0.001, REM: 0.002 | 0.64 |
| G | 0.22 | 0.23 | 1.59 | 0.01 | 0.001 | 0.03 | 0.003 | 0.025 | 0.025 | 0.0021 | — | 0.97 |
| H | 0.44 | 0.15 | 2.05 | 0.01 | 0.001 | 0.03 | 0.002 | 0.034 | 0.034 | 0.0022 | — | 1.37 |
| I | 0.32 | 1.35 | 0.45 | 0.01 | 0.001 | 0.03 | 0.002 | 0.021 | 0.021 | 0.0025 | — | 0.21 |
| J | 0.31 | 0.25 | 2.15 | 0.01 | 0.001 | 0.02 | 0.003 | 0.000 | 0.000 | 0.0000 | — | −0.04 |

Expression (1): (Nb + (Ti − 3.4N)) + 100B)/((C/8) + Si)

TABLE 2

| | | Hot rolling | | | | | Cold rolling | Annealing | | | | | | | | |
|---|---|---|---|---|---|---|---|---|---|---|---|---|---|---|---|---|
| Specimen No. | Steel ID | FDT °C. | Cooling rate 1 °C./s | First cooling temp. °C. | Cooling rate 2 °C./s | CT °C. | Rolling reduction % | Average heating rate °C./s | First soaking temp. °C. | Holding time s | Cooling rate 3 °C./s | Cooling end temp. °C. | Second soaking temp. °C. | Holding time s | Coating or plating | Remarks |
| 1 | A | 900 | 100 | 660 | 20 | 500 | 50 | 10 | 830 | 180 | 6 | 250 | 400 | 300 | GA | Example |
| 2 | B | 900 | 100 | 660 | 20 | 500 | 50 | 10 | 830 | 180 | 6 | 250 | 400 | 300 | GA | Example |
| 3 | C | 900 | 100 | 660 | 20 | 500 | 50 | 10 | 830 | 180 | 6 | 250 | 400 | 300 | GA | Example |
| 4 | D | 900 | 100 | 660 | 20 | 500 | 50 | 10 | 830 | 180 | 6 | 250 | 400 | 300 | GA | Example |
| 5 | E | 900 | 100 | 660 | 20 | 500 | 50 | 10 | 830 | 180 | 6 | 250 | 400 | 300 | GA | Example |
| 6 | F | 900 | 100 | 660 | 20 | 500 | 50 | 10 | 830 | 180 | 6 | 250 | 400 | 300 | GA | Example |
| 7 | A | 900 | 100 | 660 | 20 | 500 | 50 | 10 | 830 | 180 | 6 | 250 | 400 | 300 | CR | Example |
| 8 | B | 900 | 100 | 660 | 20 | 500 | 50 | 10 | 830 | 180 | 6 | 250 | 400 | 300 | CR | Example |
| 9 | C | 900 | 100 | 660 | 20 | 500 | 50 | 10 | 830 | 180 | 6 | 250 | 400 | 300 | CR | Example |
| 10 | D | 900 | 100 | 660 | 20 | 500 | 50 | 10 | 830 | 180 | 6 | 250 | 400 | 300 | CR | Example |
| 11 | E | 900 | 100 | 660 | 20 | 500 | 50 | 10 | 830 | 180 | 6 | 250 | 400 | 300 | CR | Example |
| 12 | F | 900 | 100 | 660 | 20 | 500 | 50 | 10 | 830 | 180 | 6 | 250 | 400 | 300 | CR | Example |
| 13 | A | 900 | 100 | 660 | 20 | 500 | 50 | 10 | 830 | 180 | 6 | 250 | 400 | 300 | AS | Example |
| 14 | B | 900 | 100 | 660 | 20 | 500 | 50 | 10 | 830 | 180 | 6 | 250 | 400 | 300 | AS | Example |
| 15 | C | 900 | 100 | 660 | 20 | 500 | 50 | 10 | 830 | 180 | 6 | 250 | 400 | 300 | AS | Example |
| 16 | D | 900 | 100 | 660 | 20 | 500 | 50 | 10 | 830 | 180 | 6 | 250 | 400 | 300 | AS | Example |
| 17 | E | 900 | 100 | 660 | 20 | 500 | 50 | 10 | 830 | 180 | 6 | 250 | 400 | 300 | AS | Example |
| 18 | F | 900 | 100 | 660 | 20 | 500 | 50 | 10 | 830 | 180 | 6 | 250 | 400 | 300 | AS | Example |
| 19 | A | 900 | 100 | 660 | 20 | 500 | 50 | 10 | 830 | 180 | 6 | 250 | 400 | 300 | GI | Example |
| 20 | B | 900 | 100 | 660 | 20 | 500 | 50 | 10 | 830 | 180 | 6 | 250 | 400 | 300 | GI | Example |
| 21 | C | 900 | 100 | 660 | 20 | 500 | 50 | 10 | 830 | 180 | 6 | 250 | 400 | 300 | GI | Example |
| 22 | D | 900 | 100 | 660 | 20 | 500 | 50 | 10 | 830 | 180 | 6 | 250 | 400 | 300 | GI | Example |
| 23 | E | 900 | 100 | 660 | 20 | 500 | 50 | 10 | 830 | 180 | 6 | 250 | 400 | 300 | GI | Example |
| 24 | F | 900 | 100 | 660 | 20 | 500 | 50 | 10 | 830 | 180 | 6 | 250 | 400 | 300 | GI | Example |
| 25 | A | 900 | 100 | 660 | 20 | 500 | 50 | 10 | 830 | 180 | 6 | 250 | 400 | 300 | EZN | Example |
| 26 | B | 900 | 100 | 660 | 20 | 500 | 50 | 10 | 830 | 180 | 6 | 250 | 400 | 300 | EZN | Example |
| 27 | C | 900 | 100 | 660 | 20 | 500 | 50 | 10 | 830 | 180 | 6 | 250 | 400 | 300 | EZN | Example |
| 28 | D | 900 | 100 | 660 | 20 | 500 | 50 | 10 | 830 | 180 | 6 | 250 | 400 | 300 | EZN | Example |
| 29 | E | 900 | 100 | 660 | 20 | 500 | 50 | 10 | 830 | 180 | 6 | 250 | 400 | 300 | EZN | Example |
| 30 | F | 900 | 100 | 660 | 20 | 500 | 50 | 10 | 830 | 180 | 6 | 250 | 400 | 300 | EZN | Example |
| 31 | A | 900 | 100 | 660 | 20 | 500 | 50 | 10 | 830 | 180 | 6 | 250 | 400 | 300 | GA | Example |
| 32 | A | 900 | 100 | 660 | 20 | 500 | 50 | 10 | 830 | 180 | 6 | 250 | 400 | 300 | GA | Example |
| 33 | A | 900 | 100 | 660 | 20 | 500 | 50 | 10 | 830 | 180 | 6 | 250 | 400 | 300 | GA | Example |
| 34 | A | 900 | 100 | 660 | 20 | 500 | 50 | 10 | 830 | 180 | 6 | 250 | 400 | 300 | GA | Example |
| 35 | A | 900 | 100 | 660 | 20 | 500 | 50 | 10 | 830 | 180 | 6 | 250 | 400 | 300 | GA | Example |
| 36 | A | 900 | 100 | 660 | 20 | 500 | 50 | 10 | 830 | 180 | 6 | 250 | 400 | 300 | GA | Example |
| 37 | A | 900 | 100 | 660 | 20 | 500 | 50 | 10 | 830 | 180 | 6 | 250 | 400 | 300 | GA | Example |
| 38 | A | 900 | 100 | 660 | 20 | 500 | 50 | 10 | 830 | 180 | 6 | 250 | 400 | 300 | GA | Example |
| 39 | A | 900 | 100 | 660 | 20 | 500 | 50 | 10 | 830 | 180 | 6 | 250 | 400 | 300 | GA | Example |
| 40 | A | 900 | 100 | 660 | 20 | 500 | 50 | 10 | 830 | 180 | 6 | 250 | 400 | 300 | GA | Example |
| 41 | A | 900 | 100 | 660 | 20 | 500 | 50 | 10 | 830 | 180 | 6 | 250 | 400 | 300 | GA | Example |
| 42 | A | 900 | 30 | 660 | 20 | 500 | 50 | 10 | 830 | 180 | 6 | 250 | 400 | 300 | GA | Comparative example |
| 43 | A | 900 | 100 | 770 | 20 | 500 | 50 | 10 | 830 | 180 | 6 | 250 | 400 | 300 | GA | Comparative example |
| 44 | A | 900 | 100 | 660 | 2 | 500 | 50 | 10 | 830 | 180 | 6 | 250 | 400 | 300 | GA | Comparative example |

TABLE 2-continued

| | | Hot rolling | | | | | Cold rolling | Annealing | | | | | | | | |
|---|---|---|---|---|---|---|---|---|---|---|---|---|---|---|---|---|
| Specimen No. | Steel ID | FDT °C | Cooling rate 1 °C./s | First cooling temp. °C | Cooling rate 2 °C./s | CT °C | Rolling reduction % | Average heating rate °C./s | First soaking temp. °C | Holding time s | Cooling rate 3 °C./s | Cooling end temp. °C | Second soaking temp. °C | Holding time s | Coating or plating | Remarks |
| 45 | A | 900 | 100 | 700 | 20 | 680 | 50 | 10 | 830 | 180 | 6 | 250 | 400 | 300 | GA | Comparative example |
| 46 | A | 900 | 100 | 660 | 20 | 500 | 50 | 1 | 830 | 180 | 6 | 250 | 400 | 300 | GA | Comparative example |
| 47 | B | 900 | 100 | 660 | 20 | 500 | 50 | 10 | 600 | 180 | 6 | 250 | 400 | 300 | GA | Comparative example |
| 48 | B | 900 | 100 | 660 | 20 | 500 | 50 | 10 | 950 | 180 | 6 | 250 | 400 | 300 | GA | Comparative example |
| 49 | B | 900 | 100 | 660 | 20 | 500 | 50 | 10 | 800 | 5 | 6 | 250 | 400 | 300 | GA | Comparative example |
| 50 | B | 900 | 100 | 660 | 20 | 500 | 50 | 10 | 830 | 180 | 1 | 250 | 400 | 300 | GA | Comparative example |
| 51 | B | 900 | 100 | 660 | 20 | 500 | 50 | 10 | 830 | 180 | 6 | 450 | 450 | 300 | GA | Comparative example |
| 52 | B | 900 | 100 | 660 | 20 | 500 | 50 | 10 | 830 | 180 | 6 | 100 | 350 | 300 | GA | Comparative example |
| 53 | B | 900 | 100 | 660 | 20 | 500 | 50 | 10 | 830 | 180 | 6 | 250 | 550 | 300 | GA | Comparative example |
| 54 | B | 900 | 100 | 660 | 20 | 500 | 50 | 10 | 830 | 180 | 6 | 200 | 300 | 300 | GA | Comparative example |
| 55 | B | 900 | 100 | 660 | 20 | 500 | 50 | 10 | 830 | 180 | 6 | 250 | 400 | 10 | GA | Comparative example |
| 56 | G | 900 | 100 | 660 | 20 | 500 | 50 | 10 | 830 | 180 | 6 | 250 | 400 | 300 | GA | Comparative example |
| 57 | H | 900 | 100 | 660 | 20 | 500 | 50 | 10 | 830 | 180 | 6 | 250 | 400 | 300 | GA | Comparative example |
| 58 | I | 900 | 100 | 660 | 20 | 500 | 50 | 10 | 830 | 180 | 5 | 250 | 400 | 300 | GA | Example |
| 59 | J | 900 | 100 | 660 | 20 | 500 | 50 | 10 | 830 | 180 | 6 | 250 | 400 | 300 | GA | Comparative example |
| 60 | A | 900 | 100 | 660 | 20 | 500 | 50 | 10 | 800 | 180 | 6 | — | — | — | GA | Comparative example |
| 61 | B | 900 | 100 | 660 | 20 | 500 | 50 | 10 | 800 | 180 | 6 | — | — | — | GA | Comparative example |

TABLE 3

| Specimen No. | Steel ID | Hot pressing | | | | | Remarks |
|---|---|---|---|---|---|---|---|
| | | Heating rate °C./s | Heating temp. °C. | Holding time s | Hot pressing temp. °C. | Cooling rate up to 150° C. °C./s | |
| 1 | A | 5 | 900 | 60 | 700 | 100 | Example |
| 2 | B | 5 | 900 | 60 | 700 | 100 | Example |
| 3 | C | 5 | 900 | 60 | 700 | 100 | Example |
| 4 | D | 5 | 900 | 60 | 700 | 100 | Example |
| 5 | E | 5 | 900 | 60 | 700 | 100 | Example |
| 6 | F | 5 | 900 | 60 | 700 | 100 | Example |
| 7 | A | 5 | 900 | 60 | 700 | 100 | Example |
| 8 | B | 5 | 900 | 60 | 700 | 100 | Example |
| 9 | C | 5 | 900 | 60 | 700 | 100 | Example |
| 10 | D | 5 | 900 | 60 | 700 | 100 | Example |
| 11 | E | 5 | 900 | 60 | 700 | 100 | Example |
| 12 | F | 5 | 900 | 60 | 700 | 100 | Example |
| 13 | A | 5 | 900 | 180 | 700 | 100 | Example |
| 14 | B | 5 | 900 | 180 | 700 | 100 | Example |
| 15 | C | 5 | 900 | 180 | 700 | 100 | Example |
| 16 | D | 5 | 900 | 180 | 700 | 100 | Example |
| 17 | E | 5 | 900 | 180 | 700 | 100 | Example |
| 18 | F | 5 | 900 | 180 | 700 | 100 | Example |
| 19 | A | 5 | 900 | 180 | 700 | 100 | Example |
| 20 | B | 5 | 900 | 180 | 700 | 100 | Example |
| 21 | C | 5 | 900 | 180 | 700 | 100 | Example |
| 22 | D | 5 | 900 | 180 | 700 | 100 | Example |
| 23 | E | 5 | 900 | 180 | 700 | 100 | Example |
| 24 | F | 5 | 900 | 180 | 700 | 100 | Example |
| 25 | A | 5 | 900 | 60 | 700 | 100 | Example |
| 26 | B | 5 | 900 | 60 | 700 | 100 | Example |
| 27 | C | 5 | 900 | 60 | 700 | 100 | Example |
| 28 | D | 5 | 900 | 60 | 700 | 100 | Example |
| 29 | E | 5 | 900 | 60 | 700 | 100 | Example |
| 30 | F | 5 | 900 | 60 | 700 | 100 | Example |
| 31 | A | 3 | 900 | 60 | 700 | 100 | Example |
| 32 | A | 90 | 900 | 60 | 700 | 100 | Example |
| 33 | A | 180 | 900 | 60 | 700 | 100 | Example |
| 34 | A | 5 | 830 | 60 | 700 | 100 | Example |
| 35 | A | 5 | 950 | 60 | 700 | 100 | Example |
| 36 | A | 5 | 900 | 5 | 700 | 100 | Example |
| 37 | A | 5 | 900 | 300 | 700 | 100 | Example |
| 38 | A | 5 | 900 | 60 | 650 | 100 | Example |
| 39 | A | 5 | 900 | 60 | 750 | 100 | Example |
| 40 | A | 5 | 900 | 60 | 700 | 50 | Example |
| 41 | A | 5 | 900 | 60 | 700 | 300 | Example |
| 42 | A | 5 | 900 | 60 | 700 | 100 | Comparative example |
| 43 | A | 5 | 900 | 60 | 700 | 100 | Comparative example |
| 44 | A | 5 | 900 | 60 | 700 | 100 | Comparative example |
| 45 | A | 5 | 900 | 60 | 700 | 100 | Comparative example |
| 46 | A | 5 | 900 | 60 | 700 | 100 | Comparative example |
| 47 | B | 5 | 900 | 60 | 700 | 100 | Comparative example |
| 48 | B | 5 | 900 | 60 | 700 | 100 | Comparative example |
| 49 | B | 5 | 900 | 60 | 700 | 100 | Comparative example |
| 50 | B | 5 | 900 | 60 | 700 | 100 | Comparative example |
| 51 | B | 5 | 900 | 60 | 700 | 100 | Comparative example |
| 52 | B | 5 | 900 | 60 | 700 | 100 | Comparative example |
| 53 | B | 5 | 900 | 60 | 700 | 100 | Comparative example |
| 54 | B | 5 | 900 | 60 | 700 | 100 | Comparative example |
| 55 | B | 5 | 900 | 60 | 700 | 100 | Comparative example |
| 56 | G | 5 | 900 | 60 | 700 | 100 | Comparative example |
| 57 | H | 5 | 900 | 60 | 700 | 100 | Comparative example |
| 58 | I | 5 | 900 | 60 | 700 | 100 | Example |
| 59 | J | 5 | 900 | 60 | 700 | 100 | Comparative example |
| 60 | A | 5 | 900 | 60 | 700 | 100 | Comparative example |
| 61 | B | 5 | 900 | 60 | 700 | 100 | Comparative example |

TABLE 4

| | Microstructure of cold-rolled steel sheet | | | | | Microstructure of hot-pressed member | | | |
|---|---|---|---|---|---|---|---|---|---|
| | Martensite | Bainite | | Volume fraction (%) | Nb-based and Ti-based precipitates smaller than 0.10 μm (counts/100 μm²) | Martensite Volume fraction (%) | Prior austenite Average grain size (μm) | Nb-based and Ti-based precipitates smaller than 0.10 μm (counts/100 μm²) | |
| Specimen No. | Aspect ratio | Volume fraction (%) | Average grain size (μm) | | | | | | B concentration ratio | Remarks |
| 1 | 2.1 | 18 | 5 | 32 | 32 | 97 | 6 | 21 | 5.5 | Example |
| 2 | 1.8 | 21 | 5 | 28 | 34 | 98 | 6 | 27 | 5.4 | Example |
| 3 | 2.3 | 24 | 5 | 31 | 35 | 98 | 7 | 21 | 6.2 | Example |
| 4 | 2.1 | 27 | 5 | 28 | 33 | 99 | 6 | 20 | 7.1 | Example |
| 5 | 1.7 | 38 | 5 | 20 | 32 | 100 | 6 | 22 | 5.3 | Example |
| 6 | 2.2 | 19 | 6 | 21 | 28 | 98 | 6 | 21 | 8.2 | Example |
| 7 | 2.3 | 24 | 5 | 22 | 31 | 98 | 6 | 20 | 6.2 | Example |
| 8 | 1.8 | 27 | 5 | 26 | 31 | 99 | 6 | 21 | 7.1 | Example |
| 9 | 1.9 | 18 | 5 | 31 | 29 | 99 | 7 | 22 | 6.8 | Example |
| 10 | 1.9 | 19 | 5 | 28 | 30 | 99 | 6 | 20 | 8.8 | Example |
| 11 | 1.8 | 29 | 4 | 31 | 32 | 100 | 6 | 20 | 6.2 | Example |
| 12 | 1.7 | 31 | 5 | 34 | 32 | 99 | 5 | 23 | 7.1 | Example |
| 13 | 1.8 | 28 | 4 | 33 | 33 | 98 | 6 | 24 | 5.9 | Example |
| 14 | 2.3 | 20 | 5 | 28 | 32 | 98 | 6 | 22 | 6.8 | Example |
| 15 | 1.8 | 31 | 5 | 39 | 32 | 97 | 5 | 21 | 7.2 | Example |
| 16 | 1.9 | 28 | 6 | 22 | 33 | 98 | 6 | 20 | 8.1 | Example |
| 17 | 1.9 | 33 | 4 | 28 | 37 | 99 | 6 | 20 | 5.9 | Example |
| 18 | 1.8 | 29 | 5 | 27 | 38 | 100 | 6 | 21 | 7.0 | Example |
| 19 | 1.7 | 20 | 4 | 28 | 32 | 98 | 7 | 22 | 6.2 | Example |
| 20 | 1.8 | 16 | 5 | 28 | 30 | 98 | 7 | 20 | 7.2 | Example |
| 21 | 1.9 | 21 | 5 | 39 | 31 | 99 | 6 | 23 | 8.1 | Example |
| 22 | 1.8 | 23 | 5 | 22 | 32 | 98 | 6 | 24 | 6.7 | Example |
| 23 | 1.7 | 37 | 6 | 28 | 31 | 98 | 6 | 22 | 6.2 | Example |
| 24 | 1.8 | 24 | 4 | 27 | 32 | 97 | 7 | 21 | 5.2 | Example |
| 25 | 2.3 | 29 | 5 | 28 | 33 | 98 | 6 | 20 | 6.1 | Example |
| 26 | 1.8 | 30 | 5 | 28 | 30 | 99 | 6 | 21 | 7.0 | Example |
| 27 | 2.1 | 22 | 4 | 31 | 33 | 100 | 5 | 22 | 6.2 | Example |
| 28 | 1.7 | 29 | 5 | 28 | 37 | 98 | 5 | 20 | 7.8 | Example |
| 29 | 2.2 | 38 | 4 | 20 | 38 | 98 | 6 | 23 | 6.7 | Example |
| 30 | 1.7 | 28 | 4 | 21 | 32 | 99 | 6 | 24 | 5.7 | Example |
| 31 | 1.8 | 22 | 5 | 22 | 30 | 98 | 6 | 21 | 6.9 | Example |
| 32 | 1.9 | 29 | 5 | 26 | 29 | 97 | 6 | 23 | 8.1 | Example |
| 33 | 1.8 | 20 | 5 | 26 | 30 | 98 | 7 | 24 | 6.9 | Example |
| 34 | 1.7 | 16 | 5 | 31 | 32 | 99 | 6 | 21 | 5.9 | Example |
| 35 | 1.8 | 21 | 4 | 28 | 33 | 100 | 6 | 20 | 5.3 | Example |
| 36 | 1.9 | 23 | 5 | 28 | 33 | 98 | 7 | 21 | 6.2 | Example |
| 37 | 1.8 | 31 | 4 | 28 | 33 | 98 | 6 | 22 | 6.8 | Example |
| 38 | 1.8 | 28 | 5 | 31 | 37 | 98 | 6 | 20 | 6.2 | Example |
| 39 | 1.8 | 22 | 4 | 28 | 38 | 98 | 6 | 23 | 6.7 | Example |
| 40 | 1.7 | 19 | 5 | 20 | 32 | 97 | 5 | 24 | 6.2 | Example |
| 41 | 1.8 | 22 | 4 | 22 | 30 | 98 | 6 | 22 | 7.1 | Example |
| 42 | 1.9 | 15 | 7 | 21 | 13 | 98 | 8 | 8 | 4.3 | Comparative example |
| 43 | 2.1 | 21 | 7 | 29 | 21 | 99 | 8 | 14 | 2.8 | Comparative example |

TABLE 4-continued

| | Microstructure of cold-rolled steel sheet | | | | | Microstructure of hot-pressed member | | | | |
|---|---|---|---|---|---|---|---|---|---|---|
| | Martensite | | Bainite | | Nb-based and Ti-based precipitates smaller than 0.10 μm (counts/100 μm²) | Martensite | Prior austenite | Nb-based and Ti-based precipitates smaller than 0.10 μm (counts/100 μm²) | | |
| Specimen No. | Aspect ratio | Volume fraction (%) | Average grain size (μm) | Volume fraction (%) | | Volume fraction (%) | Average grain size (μm) | | B concentration ratio | Remarks |
| 44 | 2.8 | 18 | 7 | 19 | 12 | 98 | 7 | 7 | 3.6 | Comparative example |
| 45 | 2.1 | 19 | 7 | 18 | 12 | 98 | 7 | 7 | 4.1 | Comparative example |
| 46 | 2.8 | 22 | 7 | 16 | 14 | 99 | 8 | 11 | 4.1 | Comparative example |
| 47 | — | 0 | — | 0 | 15 | 96 | 9 | 10 | 2.4 | Comparative example |
| 48 | 2.9 | 54 | 8 | 34 | 10 | 98 | 8 | 7 | 4.1 | Comparative example |
| 49 | 1.9 | 8 | 2 | 4 | 16 | 98 | 7 | 12 | 2.7 | Comparative example |
| 50 | 2.1 | 12 | 9 | 11 | 14 | 98 | 8 | 8 | 3.1 | Comparative example |
| 51 | 2.3 | 16 | 6 | 9 | 18 | 98 | 7 | 9 | 2.9 | Comparative example |
| 52 | 2.7 | 65 | 5 | 24 | 19 | 99 | 8 | 14 | 2.9 | Comparative example |
| 53 | 2.2 | 34 | 5 | 4 | 16 | 98 | 7 | 8 | 2.7 | Comparative example |
| 54 | 2.1 | 30 | 5 | 19 | 12 | 98 | 7 | 8 | 2.4 | Comparative example |
| 55 | 2.3 | 29 | 4 | 4 | 19 | 98 | 7 | 12 | 2.8 | Comparative example |
| 56 | 1.8 | 9 | 5 | 21 | 15 | 94 | 7 | 12 | 3.9 | Comparative example |
| 57 | 2.8 | 54 | 7 | 29 | 25 | 98 | 8 | 15 | 2.8 | Comparative example |
| 58 | 2.5 | 22 | 6 | 25 | 24 | 98 | 7 | 12 | 6.3 | Example |
| 59 | 2.1 | 24 | 6 | 26 | 0 | 98 | 7 | 0 | 0.0 | Comparative example |
| 60 | 2.4 | 21 | 7 | 15 | 18 | 99 | 8 | 18 | 2.8 | Comparative example |
| 61 | 2.8 | 19 | 7 | 15 | 19 | 98 | 8 | 18 | 3.4 | Comparative example |

Underlined if outside the scope of the disclosure.

TABLE 5

| Specimen No. | Tensile strength TS (MPa) | Resistance to resistance welding cracking | Remarks |
| --- | --- | --- | --- |
| 1 | 1821 | Good | Example |
| 2 | 1832 | Good | Example |
| 3 | 1823 | Good | Example |
| 4 | 1843 | Good | Example |
| 5 | 1988 | Good | Example |
| 6 | 1820 | Good | Example |
| 7 | 1802 | Good | Example |
| 8 | 1820 | Good | Example |
| 9 | 1813 | Good | Example |
| 10 | 1821 | Good | Example |
| 11 | 1982 | Good | Example |
| 12 | 1833 | Good | Example |
| 13 | 1799 | Good | Example |
| 14 | 1813 | Good | Example |
| 15 | 1841 | Good | Example |
| 16 | 1833 | Good | Example |
| 17 | 1992 | Good | Example |
| 18 | 1843 | Good | Example |
| 19 | 1834 | Good | Example |
| 20 | 1832 | Good | Example |
| 21 | 1822 | Good | Example |
| 22 | 1853 | Good | Example |
| 23 | 1988 | Good | Example |
| 24 | 1829 | Good | Example |
| 25 | 1831 | Good | Example |
| 26 | 1823 | Good | Example |
| 27 | 1833 | Good | Example |
| 28 | 1823 | Good | Example |
| 29 | 2011 | Good | Example |
| 30 | 1833 | Good | Example |
| 31 | 1829 | Good | Example |
| 32 | 1841 | Good | Example |
| 33 | 1837 | Good | Example |
| 34 | 1825 | Good | Example |
| 35 | 1824 | Good | Example |
| 36 | 1825 | Good | Example |
| 37 | 1801 | Good | Example |
| 38 | 1841 | Good | Example |
| 39 | 1833 | Good | Example |
| 40 | 1842 | Good | Example |
| 41 | 1833 | Good | Example |
| 42 | 1811 | Poor | Comparative example |
| 43 | 1802 | Poor | Comparative example |
| 44 | 1801 | Poor | Comparative example |
| 45 | 1821 | Poor | Comparative example |
| 46 | 1811 | Poor | Comparative example |
| 47 | 1801 | Poor | Comparative example |
| 48 | 1806 | Poor | Comparative example |
| 49 | 1795 | Poor | Comparative example |
| 50 | 1824 | Poor | Comparative example |
| 51 | 1815 | Poor | Comparative example |
| 52 | 1805 | Poor | Comparative example |
| 53 | 1801 | Poor | Comparative example |
| 54 | 1815 | Poor | Comparative example |
| 55 | 1802 | Poor | Comparative example |
| 56 | <u>1549</u> | Good | Comparative example |
| 57 | <u>2215</u> | Poor | Comparative example |
| 58 | 1811 | Fair | Example |
| 59 | 1824 | Poor | Comparative example |
| 60 | 1833 | Poor | Comparative example |
| 61 | 1809 | Poor | Comparative example |

Underlined if outside the scope of the disclosure.

As can be seen from Table 5, all of our examples in which the chemical compositions and the microstructures of hot-pressed members satisfy the appropriate ranges of the present disclosure have excellent resistance to resistance welding cracking, not to mention high tensile strength.

The invention claimed is:

1. A hot-pressed member comprising:
a steel chemical composition containing, by mass %, C: 0.28% or more and less than 0.42%, Si: 1.5% or less, Mn: 1.0% or more and 2.4% or less, P: 0.05% or less, S: 0.005% or less, Al: 0.01% or more and 0.50% or less, N: 0.005% or less, Nb: 0.005% or more and 0.15% or less, Ti: 0.005% or more and 0.15% or less, and B: 0.0005% or more and 0.0050% or less, where among the components of the member, C, Si, Nb, Ti, N, and B satisfy the following Expression (1), $$(Nb+(Ti-3.4N)+100B)/((C/8)+Si) \geq 0.25 \quad (1)$$

where each element symbol represents the content by mass % of the corresponding element, with the balance being Fe and inevitable impurities;
a microstructure in which
a prior austenite average grain size is 7.5 μm or less, a volume fraction of martensite is 95% or more, and at least 10 Nb-based and Ti-based precipitates having a grain size of less than 0.10 μm are present on average per 100 μm$^2$ of a cross section parallel to a thickness direction of the member within a range of 100 μm in the thickness direction from a surface of the member;
a B concentration in prior austenite grain boundaries being at least 3.0 times a B concentration at a position 5 nm away from the grain boundaries; and
a tensile strength of 1780 MPa or more.

2. The hot-pressed member according to claim 1, wherein the steel chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to claim 1, comprising, on a surface layer thereof, an Al or Al alloy coating or plating layer or a Zn or Zn alloy coating or plating layer.

4. A cold-rolled steel sheet for hot pressing, comprising:
a chemical composition containing, by mass %, C: 0.28% or more and less than 0.42%, Si: 1.5% or less, Mn: 1.0% or more and 2.4% or less, P: 0.05% or less, S: 0.005% or less, Al: 0.01% or more and 0.50% or less, N: 0.005% or less, Nb: 0.005% or more and 0.15% or less, Ti: 0.005% or more and 0.15% or less, and B: 0.0005% or more and 0.0050% or less, where among the components of the member, C, Si, Nb, Ti, N, and B satisfy the following Expression (1), $$(Nb+(Ti-3.4N)+100B)/((C/8)+Si) \geq 0.25 \quad (1)$$

where each element symbol represents the content by mass% of the corresponding element, with the balance being Fe and inevitable impurities,
a microstructure which contains 10% or more by volume fraction of martensite having an average grain aspect ratio of 2.5 or less and 5% or more by volume fraction of bainite having an average grain size of 6 μm or less, and at least 20 Nb-based and Ti-based precipitates having a grain size of less than 0.10 μm present on average per 100 μm$^2$ of a cross section parallel to a thickness direction of the steel sheet within a range of 100 μm in the thickness direction from a surface of the steel sheet.

5. The cold-rolled steel sheet for hot pressing according to claim 4, wherein the chemical composition further contains, by mass %, at least one selected from Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn:

0.50% or less, Zn: 0.10% or less, Co: 0.10% or less, Zr: 0.10% or less, Ta: 0.10% or less, and W: 0.10% or less.

6. The cold-rolled steel sheet for hot pressing according to claim 4, wherein the steel sheet comprises on a surface thereof an Al or Al alloy coating or plating layer or a Zn or Zn alloy coating or plating layer.

7. A method for manufacturing the cold-rolled steel sheet for hot pressing as recited in claim 4, the method comprising:
preparing a steel raw material comprising a chemical composition containing, by mass %, C: 0.28% or more and less than 0.42%, Si: 1.5% or less, Mn: 1.0% or more and 2.4% or less, P: 0.05% or less, S: 0.005% or less, Al: 0.01% or more and 0.50% or less, N: 0.005% or less, Nb: 0.005% or more and 0.15% or less, Ti: 0.005% or more and 0.15% or less, and B: 0.0005% or more and 0.0050% or less, where among the components of the member, C, Si, Nb, Ti, N, and B satisfy the following Expression (1), $$(Nb+(Ti-3.4N)+100B)/((C/8)+Si) \geq 0.25 \qquad (1)$$

where each element symbol represents the content by mass % of the corresponding element, with the balance being Fe and inevitable impurities;
hot rolling the steel raw material to obtain a hot-rolled steel sheet;
after the hot rolling, subjecting the hot-rolled steel sheet to primary cooling whereby the hot-rolled steel sheet is cooled to a cooling end temperature of 700° C. or lower at a first average cooling rate of 70° C/s or higher up to the cooling end temperature;
after the primary cooling, subjecting the steel sheet to secondary cooling whereby the steel sheet is coiled at a coiling temperature of 550° C. or lower at a second average cooling rate of 5° C/s to 50° C/s up to the coiling temperature;
then pickling and cold rolling the coiled hot-rolled steel sheet to obtain a cold-rolled steel sheet; and
then subjecting the steel sheet to an annealing treatment whereby the steel sheet is heated to a first soaking temperature range of 800° C. to 900° C. at an average heating rate of 3° C/s to 30° C/s, held in the soaking temperature range for 15 seconds or longer, cooled to a cooling end temperature range of 200° C. to 350° C. at a third average cooling rate of 3° C/s or higher up to a cooling end temperature, then heated to a second soaking temperature range of 350° C. to 450° C., held in the second soaking temperature range for 120 seconds or longer, and then cooled to room temperature.

8. The method for manufacturing the cold-rolled steel sheet for hot pressing according to claim 7, wherein
the chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0. 15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

9. The method for manufacturing the cold-rolled steel sheet for hot pressing according to claim 7, the method further comprising:
after the annealing treatment, applying an Al or Al alloy coating or plating treatment or a Zn or Zn alloy coating or plating treatment to a surface of the cold-rolled steel sheet.

10. A method for manufacturing a hot-pressed member, comprising:
heating the cold-rolled steel sheet for hot pressing as recited in claim 4 in a temperature range of an $Ac_3$ transformation temperature to 1000° C.; and
then hot pressing the steel sheet.

11. The hot-pressed member according to claim 2, comprising, on a surface layer thereof, an Al or Al alloy coating or plating layer or a Zn or Zn alloy coating or plating layer.

12. The cold-rolled steel sheet for hot pressing according to claim 5, wherein the steel sheet comprises on a surface thereof an Al or Al alloy coating or plating layer or a Zn or Zn alloy coating or plating layer.

13. The method for manufacturing the cold-rolled steel sheet for hot pressing according to claim 8, the method further comprising:
after the annealing treatment, applying an Al or Al alloy coating or plating treatment or a Zn or Zn alloy coating or plating treatment to a surface of the cold-rolled steel sheet.

14. A method for manufacturing a hot-pressed member, comprising:
heating the cold-rolled steel sheet for hot pressing as recited in claim 5 in a temperature range of an $Ac_3$ transformation temperature to 1000° C.; and
then hot pressing the steel sheet.

15. A method for manufacturing a hot-pressed member, comprising:
heating the cold-rolled steel sheet for hot pressing as recited in claim 6 in a temperature range of an $Ac_3$ transformation temperature to 1000° C.; and
then hot pressing the steel sheet.

16. A method for manufacturing a hot-pressed member, comprising:
heating the cold-rolled steel sheet for hot pressing as recited in claim 12 in a temperature range of an $Ac_3$ transformation temperature to 1000° C.; and
then hot pressing the steel sheet.

\* \* \* \* \*